US012655880B1

(12) United States Patent
Lee

(10) Patent No.: US 12,655,880 B1
(45) Date of Patent: Jun. 16, 2026

(54) HEAT-DISSIPATING BRAKE ROTOR

(71) Applicant: United States of America as represented by the Administrator of NASA, Washington, DC (US)

(72) Inventor: Jonathan A. Lee, Madison, AL (US)

(73) Assignee: United States of America as represented by the Administrator of NASA, Washington, DC (US)

(*) Notice: Subject to any disclaimer, the term of this patent is extended or adjusted under 35 U.S.C. 154(b) by 516 days.

(21) Appl. No.: 18/170,820

(22) Filed: Feb. 17, 2023

Related U.S. Application Data

(60) Provisional application No. 63/268,252, filed on Feb. 18, 2022.

(51) Int. Cl.
*F16D 65/12* (2006.01)
*F16D 65/02* (2006.01)

(52) U.S. Cl.
CPC ......... *F16D 65/128* (2013.01); *F16D 65/123* (2013.01); *F16D 65/125* (2013.01); *F16D 2065/1308* (2013.01); *F16D 2065/132* (2013.01); *F16D 2065/1332* (2013.01); *F16D 2200/0021* (2013.01); *F16D 2200/003* (2013.01); *F16D 2250/0046* (2013.01)

(58) Field of Classification Search
None
See application file for complete search history.

(56) References Cited

U.S. PATENT DOCUMENTS

| | | | | |
|---|---|---|---|---|
| 8,405,994 | B2 | 3/2013 | Kinoe et al. | |
| 8,978,842 | B2 * | 3/2015 | Iwai | C23C 24/04 188/26 |
| 10,132,371 | B2 | 11/2018 | Taniguchi et al. | |
| 10,323,704 | B2 | 6/2019 | Huang | |
| 10,711,857 | B2 * | 7/2020 | Nagai | F16D 65/128 |
| 11,247,392 | B2 * | 2/2022 | Zhang | B23K 26/144 |
| 11,441,625 | B1 * | 9/2022 | Lee | F16D 65/128 |
| 11,662,300 | B2 * | 5/2023 | Ickes | G01N 19/04 73/150 A |
| 11,725,704 | B2 * | 8/2023 | Rettig | C22C 38/42 188/218 XL |
| 11,859,683 | B2 * | 1/2024 | Riehl | B33Y 70/10 |
| 2016/0333949 | A1 * | 11/2016 | Nagai | F16D 65/128 |
| 2017/0204921 | A1 * | 7/2017 | Nakakura | F16D 65/128 |
| 2018/0180125 | A1 * | 6/2018 | Hollis | C23C 24/04 |
| 2019/0011004 | A1 * | 1/2019 | Mettrick | F16D 65/127 |

(Continued)

FOREIGN PATENT DOCUMENTS

| | | | | |
|---|---|---|---|---|
| DE | 69930191 | T2 * | 8/2006 | C25D 15/02 |
| DE | 102018004270 | A1 * | 11/2019 | C23C 28/042 |

(Continued)

*Primary Examiner* — Robert A. Siconolfi
(74) *Attorney, Agent, or Firm* — Jerry L. Seemann; Trenton J. Roche

(57) ABSTRACT

A brake rotor includes a one-piece rotor body constructed of stainless steel. The rotor body has a first portion at a central region of the rotor adapted to be coupled to a vehicle's wheel, an annular second portion adjoining and circumscribing the first portion, and an annular third portion adjoining and circumscribing the second portion. The second portion has regions of ablated surfaces. The third portion has opposing braking surfaces. Aluminum coats the regions of ablated surfaces.

20 Claims, 8 Drawing Sheets

(56) References Cited

U.S. PATENT DOCUMENTS

| | | | | |
|---|---|---|---|---|
| 2019/0193207 | A1 * | 6/2019 | Kremer | F16D 65/127 |
| 2020/0292018 | A1 * | 9/2020 | Ishizaki | F16D 65/0075 |
| 2023/0182169 | A1 * | 6/2023 | Parker | B05D 3/0254<br>106/31.01 |

FOREIGN PATENT DOCUMENTS

| | | | | |
|---|---|---|---|---|
| EP | 1006218 | A2 * | 6/2000 | C25D 15/02 |
| EP | 3567269 | A1 * | 11/2019 | C23C 28/042 |

* cited by examiner

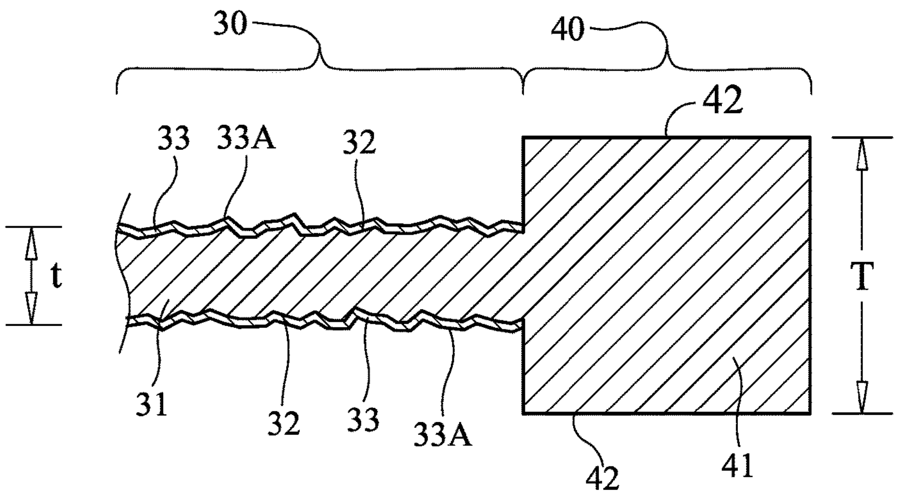
FIG. 2A
FIG. 2B
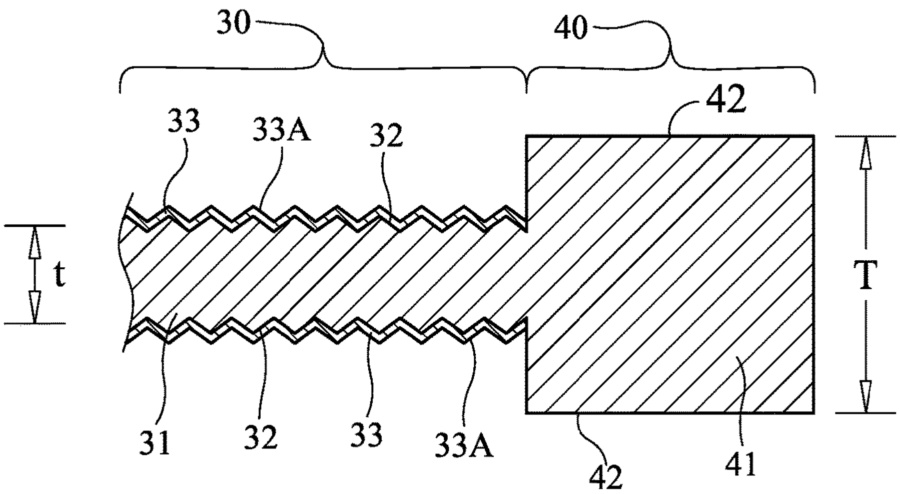
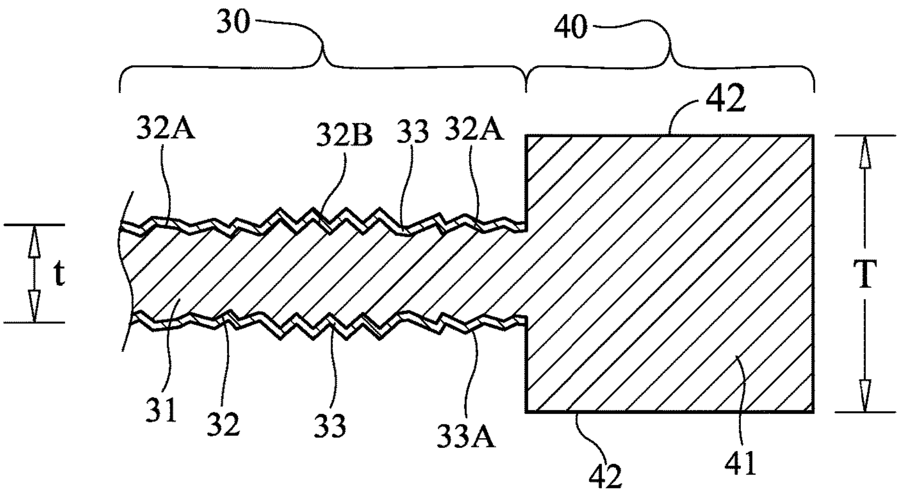
FIG. 2C

HEAT-DISSIPATING BRAKE ROTOR

CROSS-REFERENCE TO RELATED APPLICATIONS

This application claims the benefit of U.S. Application Ser. No. 62/268,252 filed on Feb. 18, 2022, hereby incorporated by reference.

ORIGIN OF THE INVENTION

The invention described herein was made by an employee of the United States Government and may be manufactured and used by or for the Government of the United States of America for governmental purposes without the payment of any royalties thereon or therefore.

BACKGROUND OF THE INVENTION

1. Field of the Invention

This invention relates to brake rotors for wheeled vehicles. More specifically, the invention is a heat-dissipating brake rotor that can be used on a wheeled vehicle such as a bicycle.

2. Description of the Related Art

A variety of types of wheeled vehicles utilize disc brakes. For example, in terms of bicycles, the rotor portion of a disc brake is generally mounted on the bicycle wheel's hub and has opposing axial surfaces that are engaged by brake calipers during a braking operation. For today's high-performance bicycles, a disc brake rotor is ideally lightweight, rigid, strong, durable, capable of dissipating heat generated during hard braking episodes, and cost effective. Unfortunately, conventional disc brake rotors for bicycles fall short of attaining all of these goals.

SUMMARY OF THE INVENTION

Accordingly, it is an object of the present invention to provide a disc brake rotor.

Another object of the present invention is to provide a disc brake rotor for bicycles that can simultaneously be lightweight, rigid, strong, durable, effective at dissipating braking-generated heat, and cost effective.

Other objects and advantages of the present invention will become more obvious hereinafter in the specification and drawings.

In accordance with the present invention, a brake rotor for a wheeled vehicle includes a one-piece rotor body constructed of stainless steel. The rotor body has a first portion at a central region of the rotor adapted to be coupled to a vehicle's wheel, an annular second portion adjoining and circumscribing the first portion, and an annular third portion adjoining and circumscribing the second portion. The second portion has regions of ablated surfaces. The third portion has opposing surfaces adapted for braking engagement with the vehicle's brake caliper. Aluminum coats the regions of ablated surfaces.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein:

FIG. 2A is a cross-sectional view of the disc brake rotor taken along line 2-2 in FIG. 1 illustrating randomly-patterned three-dimensional textured ablated surfaces in accordance with an embodiment of the present invention;

FIG. 2B is a cross-sectional view of the disc brake rotor taken along line 2-2 in FIG. 1 illustrating repetitively-patterned three-dimensional textured ablated surfaces in accordance with another embodiment of the present invention;

FIG. 2C is a cross-sectional view of the disc brake rotor taken along line 2-2 in FIG. 1 illustrating a combination of randomly-patterned and repetitively-patterned three-dimensional textured ablated surfaces in accordance with another embodiment of the present invention;

Figure 6:
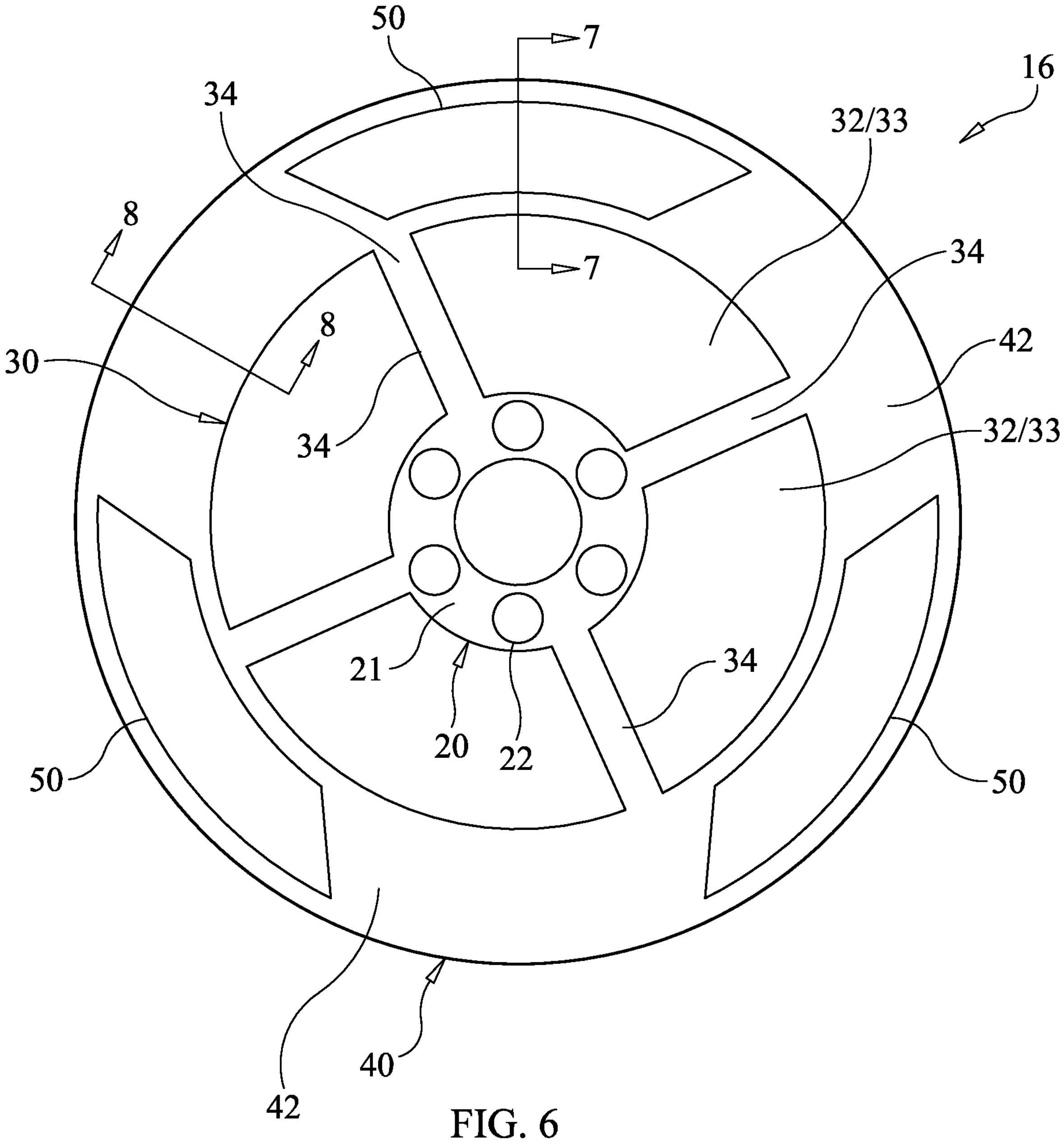
FIG. 6 is a plan view of a disc brake rotor incorporating heat-dissipating cavities in the rotor's braking portion in accordance with an embodiment of the present invention.
Figure 8A:
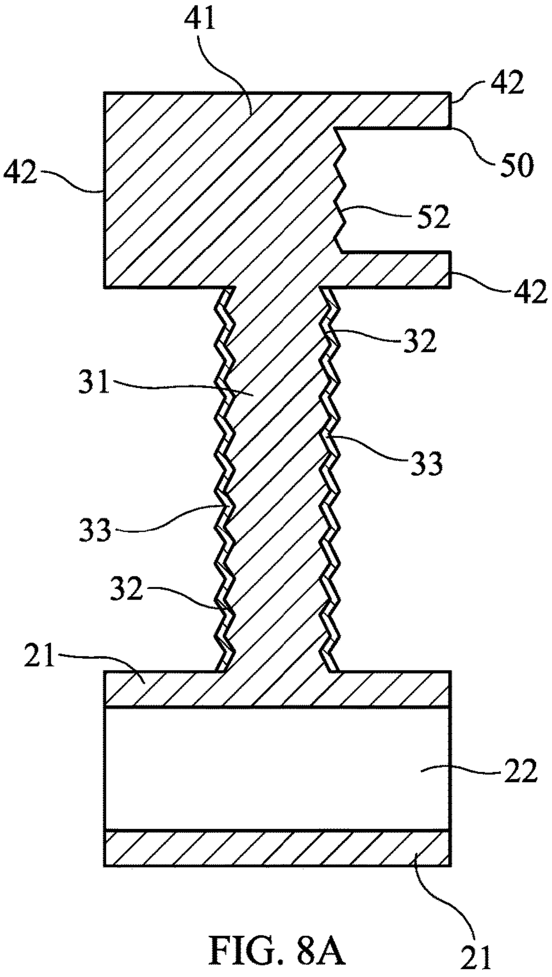
Figure 8B:
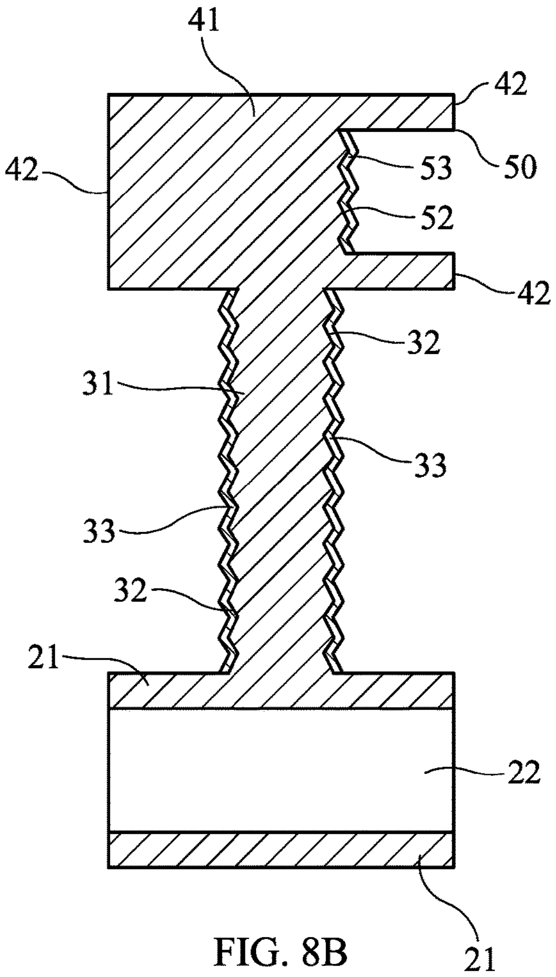

FIG. 8A is a cross-sectional view of the disc brake rotor taken along line 8-8 in FIG. 6 illustrating a cavity in the opposing one of the rotor's braking surfaces in accordance with an embodiment of the present invention; and FIG. 8B is a cross-sectional view of the disc brake rotor taken along line 8-8 in FIG. 6 illustrating a painted cavity in the opposing one of the rotor's braking surfaces in accordance with another embodiment of the present invention.

DESCRIPTION OF THE PREFERRED EMBODIMENT(S)

Figure 1:
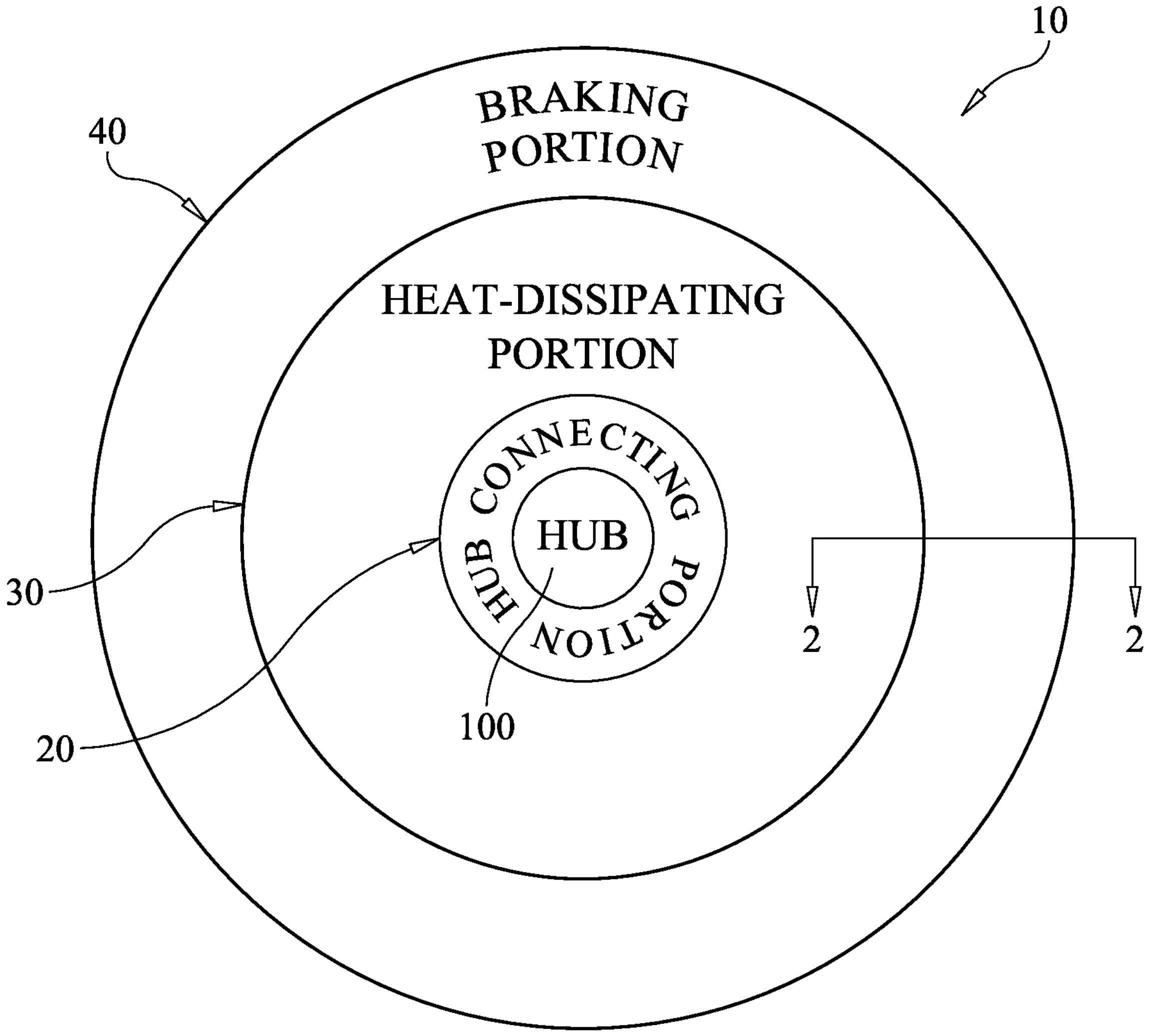
FIG. 1 is a schematic view of a heat-dissipating disc brake rotor in accordance with an embodiment of the present invention.

Referring now to the drawings and more particularly to FIG. 1, a schematic view of a heat-dissipating disc brake rotor in accordance with an embodiment of the present invention is shown and is referenced generally by numeral 10. Rotor 10 is ideally suited for use on wheeled vehicles such as bicycles that utilize disc brake systems. However, it is to be understood that the novel features of rotor 10 can be readily extended to other types of wheeled vehicles equipped with disc brake systems.

In general, rotor 10 includes a one-piece (or monolithic) rotor body made from stainless steel with certain portions of the rotor body being coated with aluminum. A variety of types of stainless steel and aluminum could be used for rotor 10 without departing from the scope of the present invention.

Rotor 10 has three portions that are contiguous or adjoining across the rotor's one-piece, stainless steel rotor body. The three portions of rotor 10 are its hub connecting portion 20 configured for coupling to a bicycle's (or other vehicle's) wheel hub 100, a heat-dissipating portion 30 circumscribing hub connecting portion 20, and a braking portion 40 circumscribing heat-dissipating portion 30 and configured for engagement by brake calipers (not shown) during a braking operation as would be well-understood in the art. The configuration of hub connecting portion 20 is not a limitation of the present invention. Further, specific construction details related to each of portions 20, 30 and 40 can be varied without departing from the scope of the present invention. However, in all embodiments of the present invention, novel heat-dissipating features of the rotor are incorporated in heat-dissipating portion 30. In some embodiments of the present invention, additional novel heat-dissipating features of the rotor can be incorporated in braking portion 40.

Heat-dissipating portion 30 includes a portion of the one-piece stainless steel rotor body and aluminum coating some or all of the exposed surfaces of the stainless steel in portion 30. In general, the exposed surfaces of the stainless steel in portion 30 that are coated with aluminum are ablated surfaces. As used herein, the term "ablated surface" refers to a three-dimensional surface texture resulting from the removal of material (i.e., stainless steel), such that the so-ablated three-dimensional textured regions are reduced in axial thickness relative to other portions of the rotor body. The stainless-steel ablated surfaces can be created in a variety of ways without departing from the scope of the present invention. For example, the partial removal of the stainless-steel material in the axial thickness direction to create an ablated surface can be accomplished using CNC micro-machining, laser etching or engraving, laser micro-machining, electrochemical etching, chemical milling, and abrasive sand blasting driving by compressive air jet. The three-dimensional ablated surface regions greatly reduce the weight of the stainless-steel rotor body while also presenting an increased surface area that, when coated with aluminum, provides enhanced heat dissipation for the rotor. Further, since the stainless-steel ablated surface regions do not compromise the nature of the one-piece rotor body, the overall strength/rigidity of the rotor is maintained.

Referring additionally now to FIGS. 2A-2C, exemplary configurations for the aluminum-coated ablated-surface regions of portion 30 are illustrated in cross-sectional views of rotor 10 taken along line 2-2 in FIG. 1. In each configuration, the one-piece stainless steel rotor body is referenced by numeral 31 in heat-dissipating portion 30 and is referenced by numeral 41 in braking portion 40. Braking portion 40 has two axially opposing and parallel surfaces 42 that define the braking surfaces for the rotor as would be understood in the art. That is, braking surfaces 42 are simply exposed portions of stainless steel 41 such that the rotor will have a long "brake" life owing to the durability of stainless steel. The axial thickness of stainless steel 41 at braking portion 40 is "T".

Heat-dissipating portion 30 includes axially opposing surfaces 32, each of which presents as a three-dimensionally-textured ablated surface. The axial thickness of stainless steel 31 between ablated surfaces 32 is "t". In the present invention, t is less than T and is generally in the range of (0.1) T and (0.8) T. The reduced thickness of the stainless-steel rotor body between ablated surfaces 32 reduces the weight of the rotor body at portion 30. However, the one-piece construction of the stainless-steel rotor body allows the rotor to maintain rigidity and strength.

Ablated surfaces 32 are coated with a thin layer of aluminum 33 (e.g., aluminum thermal spray or plasma spray coated, aluminum hot dip coated on stainless steel, etc.). When the layer of aluminum 33 is very thin (e.g., on the order of 25 to several hundred micrometers), the exposed surface 33A of aluminum 33 generally mimics the three-dimensional contours of the stainless-steel ablated surface 32. In some embodiments of the present invention, a thicker layer of aluminum can be applied to the ablated surfaces to yield an exposed surface of the aluminum that is planar or nearly planar as the aluminum fills in the contours of ablated surfaces 32.

The three-dimensional texture of ablated surfaces 32 can be random as illustrated in FIG. 2A or repetitive (i.e., a repeating pattern) as illustrated in FIG. 2B. The particular repeating pattern is not a limitation of the present invention. In some embodiments of the present invention, ablated surfaces 32 can include random textured surfaces 32A and repetitive textured surfaces 32B as illustrated in FIG. 2C. In still other embodiments of the present invention, perforations or holes can extend through ablated surfaces 32 and stainless steel 31 to provide fluid communication between opposing ablated surfaces 32 that enhances the rotor's heat-dissipating characteristics.

Figure 3:
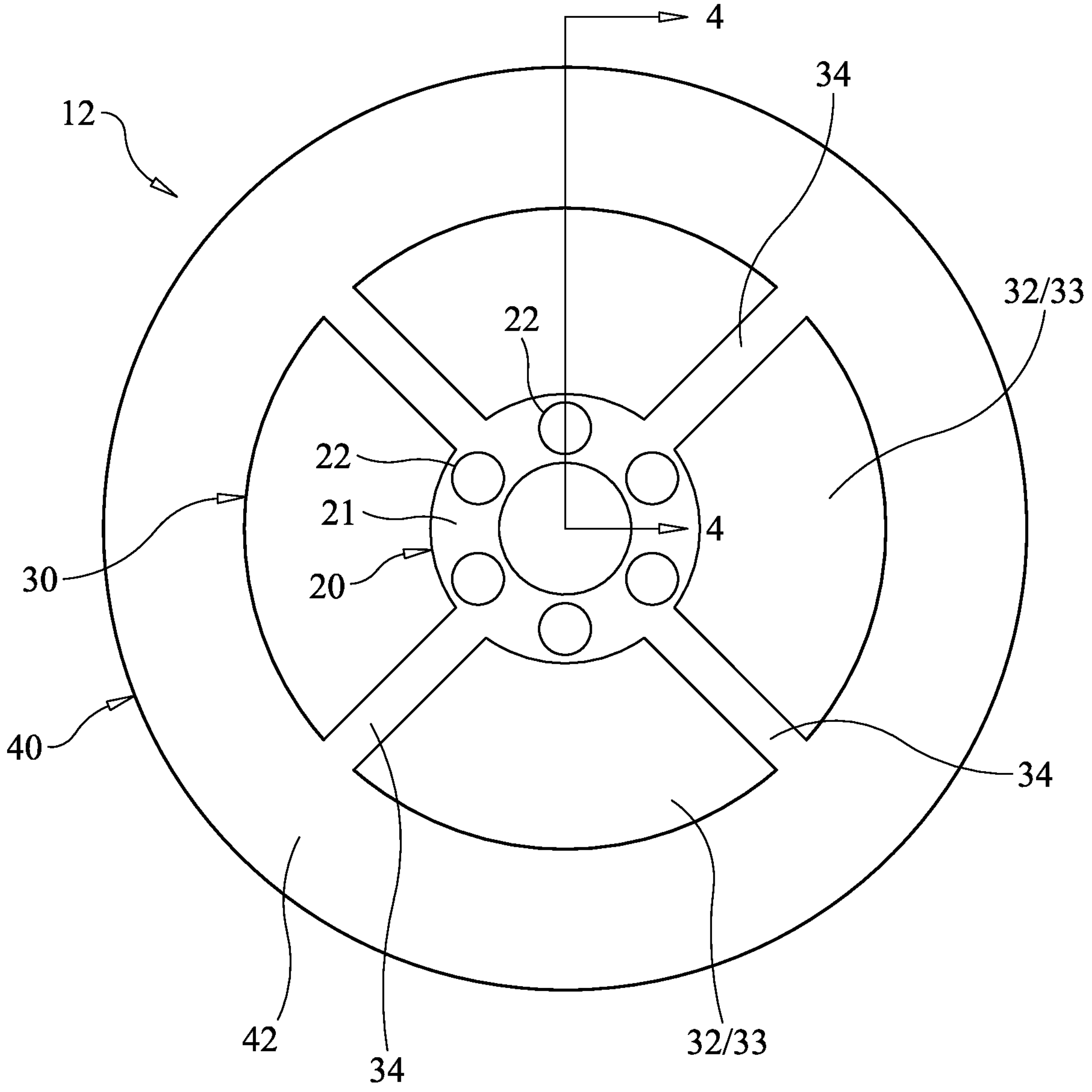
FIG. 3 is a plan view of a disc brake rotor incorporating radial arms in accordance with an embodiment of the present invention.

Non-limiting exemplary embodiments of a disc brake rotor 12 in accordance with an embodiment of the present invention will be described with simultaneous reference to FIGS. 3, 4A and 4B. A plan view of rotor 12 is shown in FIG. 3. Rotor 12 includes an annular hub connecting portion 20, an annular heat-dissipating portion 30 circumscribing portion 20, and an annular braking portion 40 circumscribing portion 30. Two embodiments of rotor 12 are illustrated in the cross-sectional views presented in FIGS. 4A and 4B taken along line 4-4 in FIG. 3.

Both embodiments of rotor 12 are configured to have the same hub connecting portion 20 and braking portion 40. More specifically, hub connecting portion 20 has an annular stainless steel ring 21 with a plurality of mounting bolt holes 22 passing there through for alignment with corresponding mounting bolt holes in a wheel's hub (not shown). Braking portion 40 includes the above-described stainless steel 41 in the form of a ring presenting annular parallel and opposing braking surfaces 42. Rings 21 and 41 are part of the rotor's one-piece stainless steel rotor body that also includes stainless steel 31 of heat-dissipating portion 30.

Heat-dissipating portion 30 includes regions of the above-described aluminum-coated, three-dimensionally-textured ablated surfaces (referenced as 32/33 in FIG. 3) disposed between radial arms 34. The number and configuration of radial arms 34 are not limitations of the present invention. In general, radial arms 34 are contiguous features of stainless steel 31 that transfer braking forces from braking portion 40 to hub connecting portion 20. Additionally, the axial thickness of radial arms 34 can be matched to that of braking portion 40 to strengthen the rotor and insure its rigidity.

Figure 4A:
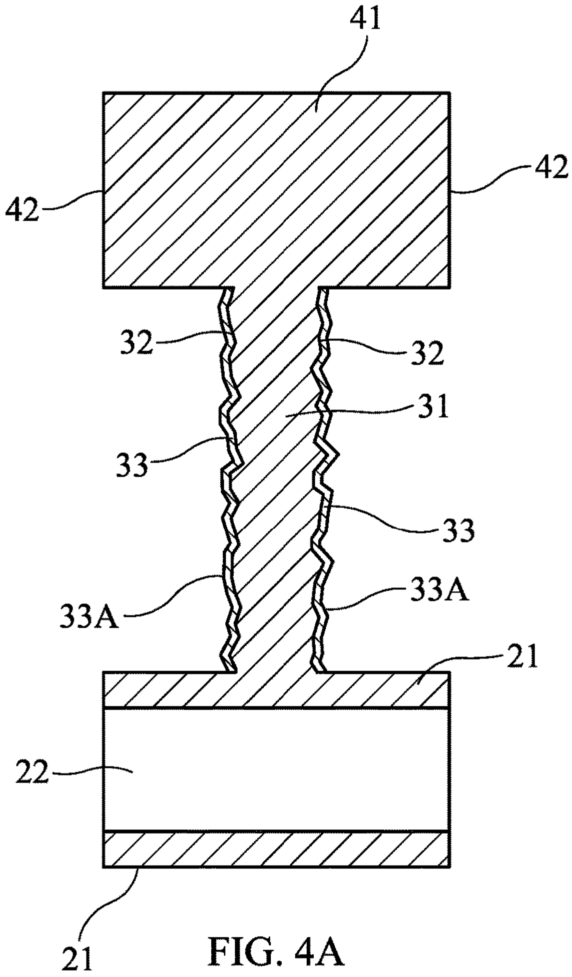
FIG. 4A is a cross-sectional view of the disc brake rotor taken along line 4-4 in FIG. 3 in accordance with an embodiment of the present invention.
Figure 4B:
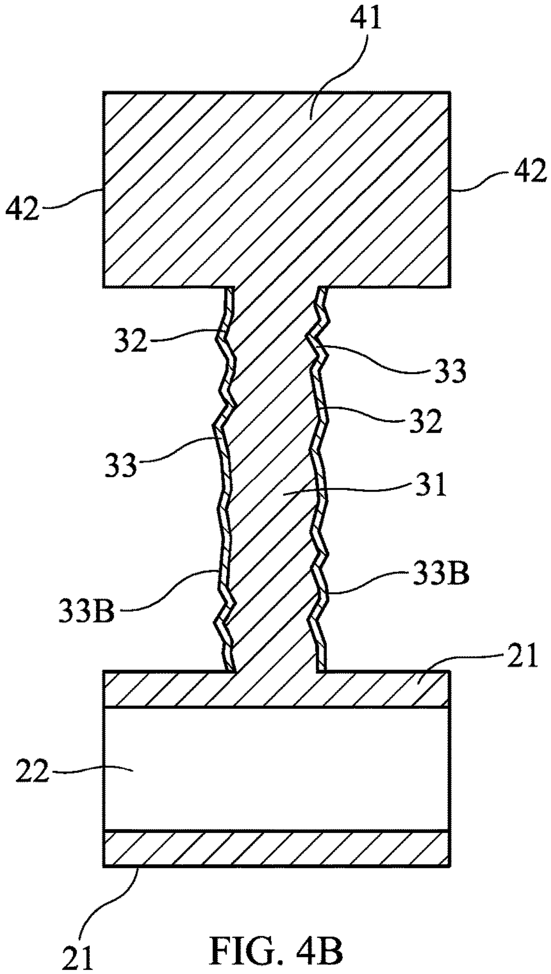
FIG. 4B is a cross-sectional view of the disc brake rotor taken along line 4-4 in FIG. 3 in accordance with another embodiment of the present invention.

In FIG. 4A, ablated surfaces 32 are coated with aluminum 33 as described previously herein. The three-dimensional texture presented by ablated surfaces 32 can be random (as shown), repetitive, or both without departing from the scope of the present invention. The exposed surface 33A of aluminum 33 in FIG. 4A is bare aluminum that has not been treated for enhanced thermal emissivity. In FIG. 4B, the exposed surface 33B of aluminum 33 is "treated" for enhanced thermal emissivity, i.e., treated to have a thermal emissivity in a range of 0.3 to 0.99. For example, surface 33B of aluminum 33 can be black anodized aluminum or surface 33B can represent paint or a coating having the required thermal emissivity.

Figure 5:
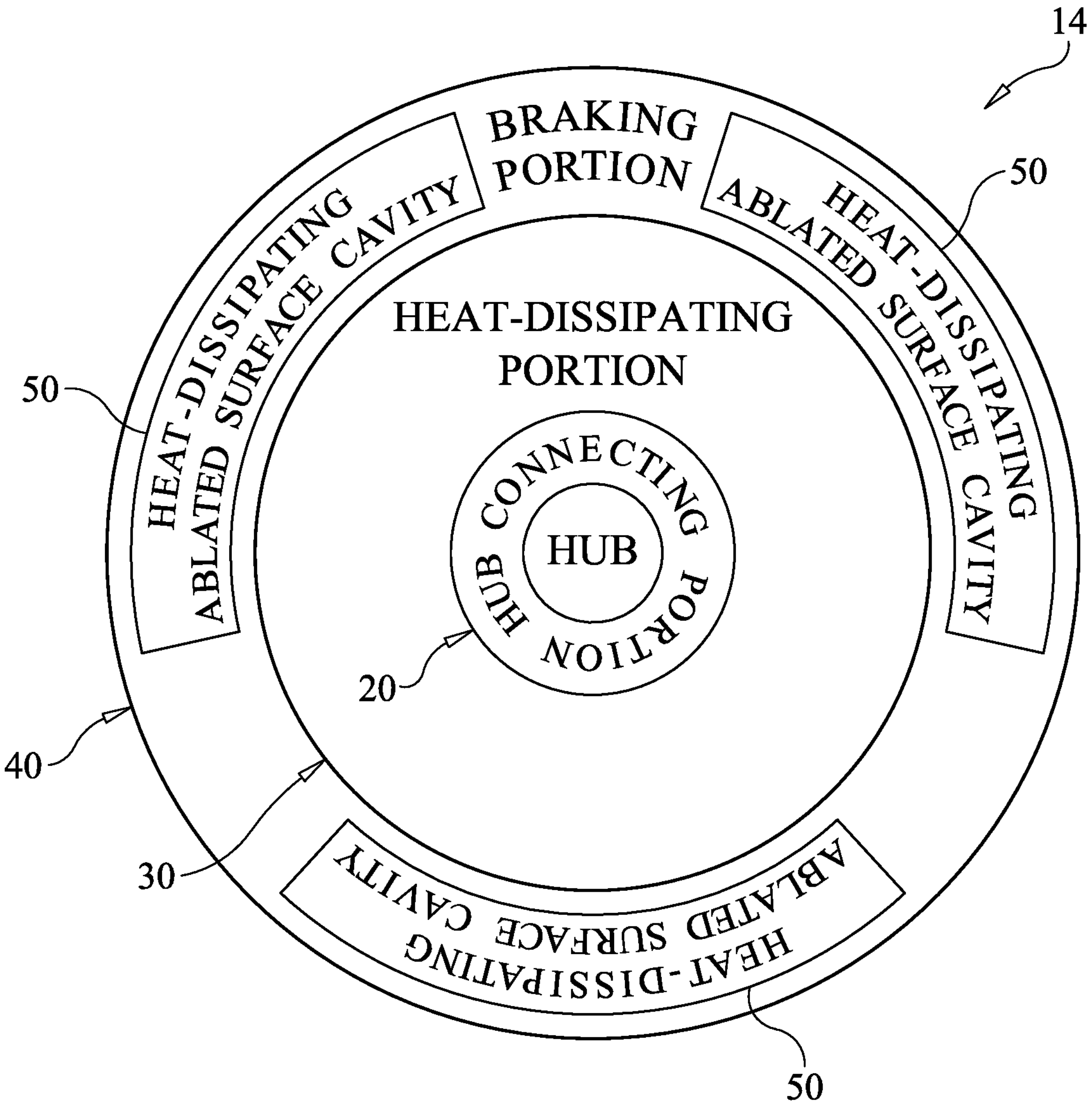
FIG. 5 is a schematic view of a heat-dissipating disc brake rotor incorporating heat-dissipating cavities in the rotor's braking portion in accordance with another embodiment of the present invention.

In some embodiments of the present invention, heat-dissipating features can also be provided in the braking portion of a disc brake rotor. For example, and with reference to FIG. 5, a disc brake rotor 14 achieves heat dissipation via the above-described heat-dissipating portion 30 and heat-dissipating ablated-surface cavities 50 dispersed about and in braking portion 40. For rotational balance, cavities 50 are provided in both braking surfaces of braking portion 40 and alternate in terms of their radial positions on the rotor. As will be explained further below, the base of each of cavities 50 is a three-dimensionally textured ablated surface. Accordingly, cavities 50 with their ablated surfaces can be created at the same time as the above-described ablated surfaces 32 for purposes of cost-effective fabrication.

Figure 7A:
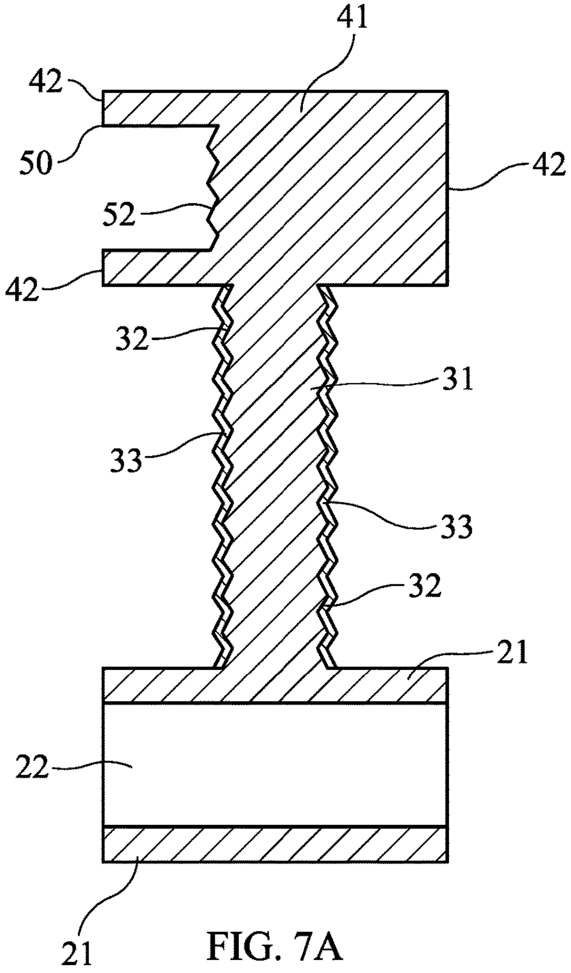
FIG. 7A is a cross-sectional view of the disc brake rotor taken along line 7-7 in FIG. 6 illustrating a cavity in one of the rotor's braking surfaces in accordance with an embodiment of the present invention.
Figure 7B:
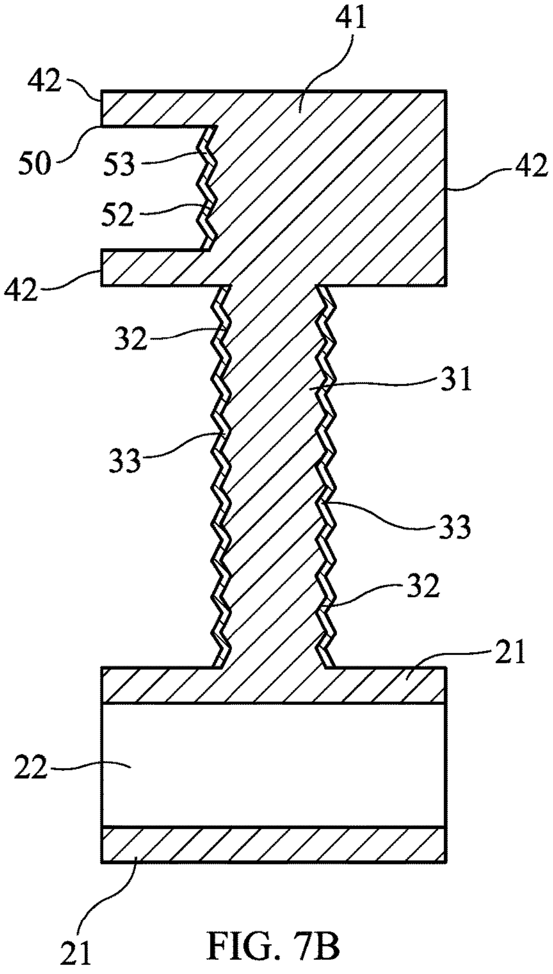
FIG. 7B is a cross-sectional view of the disc brake rotor taken along line 7-7 in FIG. 6 illustrating a painted cavity in one of the rotor's braking surfaces in accordance with another embodiment of the present invention.

Non-limiting exemplary embodiments of disc brake rotor 14 will be described with simultaneous reference to FIGS. 6, 7A, 7B, 8A and 8B. A plan view of a rotor 16 incorporating cavities 50 is shown in FIG. 6. Rotor 16 includes the above-described annular hub connecting portion 20, annular heat-dissipating portion 30 to include radial arms 34, and annular braking portion 40. Portions 20 and 30 are configured as previously described. FIGS. 7A and 7B illustrate two embodiments of cavities 50 in one side of braking portion 40, and FIGS. 8A and 8B illustrate the same two embodiments of cavities 50 in the axially-opposing side of braking portion 40.

Referring first to FIGS. 7A and 8A, each of cavities 50 is defined in the stainless steel 41 of braking portion 40. The base of cavity 50 is a three-dimensionally-textured ablated surface 52 that, just like ablated surfaces 32, can be randomly textured, repetitively textured (as shown), or both without departing from the scope of the present invention. In some embodiments of the present invention and as shown in FIGS. 7B and 8B, surfaces 52 are coated with a paint 53 having a thermal emissivity in a range of 0.3 to 0.99 to enhance the heat-dissipating qualities of cavities 50. The presence of paint 53 can also serve as a wear indicator for breaking surface 42.

The advantages of the present invention are numerous. The one-piece/monolithic stainless steel rotor body provides a strong, rigid, and durable disc brake rotor, while the ablated surface regions of the rotor body reduce the weight thereof and provide increased surface area and surface area roughness for heat dissipation when coated with aluminum. The simplicity of the one-piece, ablated-surface rotor body with its aluminum-coated regions greatly reduces manufacturing complexities and costs.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A brake rotor for a wheeled vehicle, comprising:

a one-piece rotor body constructed of stainless steel, said rotor body having a first portion at a central region of said rotor adapted to be coupled to a vehicle's wheel, an annular second portion adjoining and circumscribing said first portion, and an annular third portion adjoining and circumscribing said second portion, said second portion having regions of ablated surfaces, and said third portion having opposing surfaces adapted for braking engagement with the vehicle's brake caliper;

aluminum coating said regions of ablated surfaces; and a material having a thermal emissivity in a range of 0.30 to 0.99 coating said aluminum.

2. The brake rotor of claim 1, wherein an axial thickness of said second portion at said regions of ablated surfaces is less than an axial thickness of said third portion.

3. The brake rotor of claim 1, wherein a ratio of an axial thickness of said second portion at said regions of ablated surfaces to an axial thickness of said third portion is in a range of 0.1 to 0.8.

4. The brake rotor of claim 1, wherein said aluminum has a thickness of at least 25 micrometers.

5. The brake rotor of claim 1, wherein said aluminum is black anodized at exposed surfaces thereof.

6. The brake rotor of claim 1, further comprising cavities in said opposing surfaces of said third portion, said cavities having additional regions of ablated surfaces.

7. The brake rotor of claim 6, further comprising a paint coating said additional regions of ablated surfaces, said paint having a thermal emissivity in a range of 0.30 to 0.99.

8. A brake rotor for a wheeled vehicle, comprising:

a rotor body constructed a monolithic piece of stainless steel, said rotor body having a first portion at a central region of said rotor adapted to be coupled to a wheel hub of a wheeled vehicle, a second portion adjoining and circumscribing said first portion, and a third portion adjoining and circumscribing said second portion, said second portion having regions of three-dimensional (3D) stainless-steel ablated surfaces, and said third portion having opposing surfaces adapted for braking engagement with the wheeled vehicle's brake caliper;

aluminum coating said regions of 3D stainless-steel ablated surfaces; and a material having a thermal emissivity in a range of 0.30 to 0.99 coating said aluminum.

9. The brake rotor of claim 8, wherein an axial thickness of said second portion at said regions of 3D stainless-steel ablated surfaces is less than an axial thickness of said third portion.

10. The brake rotor of claim 8, wherein a ratio of an axial thickness of said second portion at said regions of 3D stainless-steel ablated surfaces to an axial thickness of said third portion is in a range of 0.1 to 0.8.

11. The brake rotor of claim 8, wherein said aluminum has a thickness of at least 25 micrometers.

12. The brake rotor of claim 8, wherein said aluminum is black anodized at exposed surfaces thereof.

13. The brake rotor of claim 8, further comprising cavities in said opposing surfaces of said third portion, said cavities having additional regions of three-dimensional (3D) stainless-steel ablated surfaces.

14. The brake rotor of claim 13, further comprising a paint coating said additional regions of 3D stainless-steel ablated surfaces, said paint having a thermal emissivity in a range of 0.30 to 0.99.

15. A brake rotor for a wheeled vehicle, comprising:

a one-piece rotor body constructed of stainless steel, said rotor body having a first portion at a central region of said rotor adapted to be coupled to a wheel hub of a wheeled vehicle, an annular second portion adjoining and circumscribing said first portion, and an annular third portion adjoining and circumscribing said second portion, said second portion including radial arms and regions of three-dimensional (3D) ablated surfaces, said radial arms extending between said first portion and said third portion, each of said regions of 3D ablated surfaces disposed between two of said radial arms, wherein an axial thickness of said second portion at said regions of 3D ablated surfaces is less than an axial thickness of said radial arms and less than an axial thickness of said third portion, and said third portion having opposing surfaces adapted for braking engagement with the wheeled vehicle's brake caliper;

aluminum coating said regions of 3D ablated surfaces; and a material having a thermal emissivity in a range of 0.30 to 0.99 coating said aluminum.

16. The brake rotor of claim 15, wherein a ratio of said axial thickness of said second portion at said regions of 3D ablated surfaces to said axial thickness of said third portion is in a range of 0.1 to 0.8.

17. The brake rotor of claim 15, wherein said aluminum has a thickness of at least 25 micrometers.

18. The brake rotor of claim 15, wherein said aluminum is black anodized at exposed surfaces thereof.

19. The brake rotor of claim 15, further comprising cavities in said opposing surfaces of said third portion, said cavities having additional regions of three-dimensional (3D) ablated surfaces.

20. The brake rotor of claim 19, further comprising a paint coating said additional regions of 3D ablated surfaces, said paint having a thermal emissivity in a range of 0.30 to 0.99.

* * * * *